(12) United States Patent
Norris

(10) Patent No.: US 11,982,486 B2
(45) Date of Patent: May 14, 2024

(54) TUMBLE CHILLER

(71) Applicant: D C Norris & Company Limited, Great Gransden (GB)

(72) Inventor: David Norris, Sandy (GB)

(73) Assignee: D C NORRIS & COMPANY LIMITED, Bedfordshire (GB)

( * ) Notice: Subject to any disclaimer, the term of this patent is extended or adjusted under 35 U.S.C. 154(b) by 0 days.

(21) Appl. No.: 17/370,435

(22) Filed: Jul. 8, 2021

(65) Prior Publication Data
US 2022/0026136 A1 Jan. 27, 2022

(30) Foreign Application Priority Data
Jul. 24, 2020 (GB) ...................................... 2011484

(51) Int. Cl.
*F25D 13/06* (2006.01)
(52) U.S. Cl.
CPC ................................ *F25D 13/065* (2013.01)
(58) Field of Classification Search
CPC ...... F25D 13/065; F25D 13/062; F25D 13/06; F25D 3/11; F25D 25/04; F25D 17/02; F25D 2400/30; F25D 3/127; F25D 2400/28; F25D 29/001; F25D 31/00; A47J 27/18
See application file for complete search history.

(56) References Cited

U.S. PATENT DOCUMENTS

| | | | |
|---|---|---|---|
| 4,955,209 A | 9/1990 | Smith | |
| 5,655,453 A * | 8/1997 | Ackley | A61J 3/007 101/483 |
| 6,672,098 B2 * | 1/2004 | Norris | F25D 13/065 62/374 |
| 2003/0150221 A1 | 8/2003 | Norris | |
| 2005/0287258 A1 * | 12/2005 | Kilburn | A23B 4/26 426/310 |
| 2011/0005241 A1 * | 1/2011 | Zittel et al. | F25D 13/065 62/63 |
| 2011/0091619 A1 * | 4/2011 | Yamada | F25D 13/065 62/374 |
| 2012/0047915 A1 | 3/2012 | Mccormick et al. | |

FOREIGN PATENT DOCUMENTS

| | | |
|---|---|---|
| CN | 109028711 | 12/2018 |
| GB | 2389568 | 12/2003 |
| GB | 2419396 | 4/2006 |
| GB | 2419397 | 4/2006 |
| GB | 2512405 | 10/2014 |
| WO | 2011/156497 | 12/2011 |

* cited by examiner

*Primary Examiner* — Elizabeth J Martin
*Assistant Examiner* — Dario Antonio Deleon
(74) *Attorney, Agent, or Firm* — Diederiks & Whitelaw, PLC.

(57) ABSTRACT

A system for cooling and/or heating one or more articles such as a tumble chiller is disclosed. The system comprises a reservoir 20 configured to contain a cooling and/or heating liquid 22, and a belt conveyor system. The belt conveyor system is configured in a first mode of operation to cause one or more articles to be tumbled within the reservoir 20, and in a second mode of operation to cause the one or more articles to be removed from the reservoir 20.

9 Claims, 4 Drawing Sheets

TUMBLE CHILLER

CROSS REFERENCE TO RELATED APPLICATION

This application claims priority from United Kingdom patent application No. 2011484.9, filed 24 Jul. 2020. The entire content of this application is incorporated by reference.

BACKGROUND OF THE INVENTION

The present invention relates generally to a system for cooling and/or heating articles such as bagged food products, and in particular to a tumble chiller.

The so-called "cook-chill" process is commonly used in industrial food preparation. In this process, cooked food products are packed in plastic bags immediately after being cooked. The bags are then cooled from a temperature of around 90° C. to around 4° C., typically using a tumble chiller. Rapid cooling within a tumble chiller retards bacterial regrowth, and can significantly extend the lifetime of the cooked food product.

Known tumble chillers include a rotatable drum which is partially immersed in a cooling liquid. Bags of food product are placed inside the drum, and are tumbled within the cooling liquid by rotation of the drum.

FIGS. 1A and 1B illustrate one such known tumble chiller design. Bags can be loaded into the rotatable drum inside the chiller via a chute 1. Once cooled, bags may be removed from the rotatable drum by an operator opening a door 2 of the chiller, reaching inside the rotatable drum, and manually unloading each bag from the rotatable drum.

Manual removal of bags from the tumble chiller can be difficult and time consuming, especially where e.g. each bag is relatively heavy and/or where a large number of bags must be removed from the chiller, as is commonly the case in industrial food preparation.

The Applicant believes that there remains scope for improvements to tumble chillers.

SUMMARY OF THE INVENTION

According to an aspect, there is provided a system (such as a chiller) for cooling and/or heating one or more articles, the system (e.g. chiller) comprising:

a reservoir configured to contain a (e.g. cooling and/or heating) liquid; and a belt conveyor system;

wherein the belt conveyor system is configured in a first mode of operation to cause one or more articles to be moved within the reservoir; and wherein the belt conveyor system is configured in a second mode of operation to cause one or more articles to be removed from the reservoir.

The Applicant has recognised that a belt conveyor system can be configured in a mode of operation to cause one or more articles to be moved (i.e. tumbled) within the (e.g. cooling and/or heating) liquid contained within a reservoir of a cooling and/or heating system such as a tumble chiller (i.e. in a manner similar to that of a conventional rotating drum). Furthermore, the Applicant has recognised that the belt conveyor system can also be used in another mode of operation to cause one or more articles to be removed from the reservoir.

Thus, in accordance with various embodiments, a cooling and/or heating system such as a tumble chiller includes a belt conveyor system that is configured to perform the dual function of both moving (tumbling) articles (such as bagged food products) within the (cooling and/or heating liquid of the) reservoir, and removing articles from the cooling and/or heating system (e.g. chiller).

The cooling and/or heating system (e.g. tumble chiller) of various embodiments accordingly allows articles to be removed from the cooling and/or heating system (e.g. chiller) in a more straightforward manner. The cooling and/or heating system (e.g. tumble chiller) of various embodiments also allows articles to be removed from the cooling and/or heating system (e.g. chiller) automatically, i.e. without oversight of an operator.

Furthermore, the cooling and/or heating system (e.g. tumble chiller) of various embodiments allows articles to be removed from the cooling and/or heating system (e.g. chiller) without firstly having to remove (e.g. drain) liquid from the reservoir, which would conventionally be removed (e.g. drained), e.g. to prevent an operator coming into contact with the cold (or hot) liquid. The cooling and/or heating system of various embodiments can accordingly reduce energy and water use.

It will be appreciated, therefore, that various embodiments provide an improved cooling and/or heating system, in particular an improved chiller.

The belt conveyor system may be configured in the first mode of operation to cause one or more articles to be tumbled within the reservoir.

The belt conveyor system may be configured in the first mode of operation to cause one or more articles to be rocked within the reservoir.

The belt conveyor system may be configured in the second mode of operation to cause one or more articles to be removed from the cooling and/or heating system (e.g. from the chiller).

The belt conveyor system may comprise a conveyor belt.

The belt conveyor system may be configured such that an upper part of the conveyor belt has a curved form in the first mode of operation.

The belt conveyor system may be configured such that the upper part of the conveyor belt becomes taut in the second mode of operation.

The belt conveyor system may be configured such that the upper part of the conveyor belt becomes inclined in the second mode of operation.

The belt conveyor system may comprise a conveyor belt driven by one or more sprockets.

The one or more sprockets may comprise a first set of one or more sprockets and a second set of one or more sprockets.

The belt conveyor system may be configured such that the second set of one or more sprockets is arranged in a lowered position in the first mode of operation.

The belt conveyor system may be configured to move the second set of one or more sprockets to a raised position in the second mode of operation.

The cooling and/or heating system (e.g. chiller) may comprise one or more cylinders configured to move the second set of one or more sprockets between the lowered position and the raised position.

The conveyor belt may comprise one or more fins.

The conveyor belt may comprise a mesh conveyor belt.

The liquid may be a cooling liquid.

The liquid may be a heating liquid.

The system may be a tumble chiller.

According to an aspect, there is provided a method of cooling and/or heating one or more articles, the method comprising:

using a conveyor belt to move one or more articles within a reservoir containing a (cooling and/or heating) liquid; and using the conveyor belt to remove the one or more articles from the reservoir.

The method of may comprise using the conveyor belt to tumble the one or more articles within the reservoir.

The method of may comprise using the conveyor belt to rock the one or more articles within the reservoir.

The method of may comprise using the conveyor belt to remove the one or more articles from the cooling and/or heating system (e.g. chiller).

The method may comprise causing an upper part of the conveyor belt to have a curved form when using the conveyor belt to move the one or more articles within the reservoir.

The method may comprise using the conveyor belt to remove the one or more articles from the reservoir by causing the upper part of the conveyor belt to become taut and/or inclined.

The method may comprise driving the conveyor belt using one or more sprockets, wherein the one or more sprockets comprise a first set of one or more sprockets and a second set of one or more sprockets.

The method may comprise operating the second set of one or more sprockets in a lowered position when using the conveyor belt to move the one or more articles within the reservoir.

The method may comprise using the conveyor belt to remove the one or more articles from the reservoir by moving the second set of one or more sprockets to a raised position.

BRIEF DESCRIPTION OF THE FIGURES

Various embodiments will now be described, by way of example only, and with reference to the accompanying drawings in which.

DETAILED DESCRIPTION OF THE PREFERRED EMBODIMENTS

Embodiments relate to a chiller, such as a tumble chiller. The chiller is configured to cool one or more articles, such as one or more bagged food products. The chiller may be configured to cool a plurality of articles such as a plurality of bagged food products.

Each bag may be a plastic bag, and may contain cooked (or uncooked) food product. Each bag may have any desired weight such as between around 1 and 10 kg. The chiller may be configured to cool each bag from a relatively high temperature (e.g. >around 80° C. such as around 90° C.) to a relatively low temperature (e.g. <around 5° C. such as around 4° C.). Such rapid cooling retards bacterial regrowth, and can significantly extend the lifetime of the cooked food product.

Figure 1A:
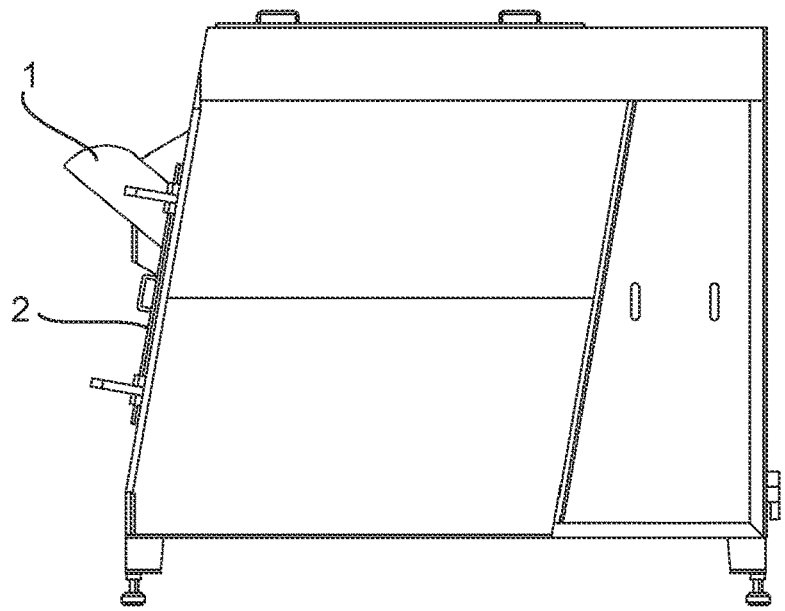
FIG. 1A shows schematically a side view of a conventional tumble chiller.
Figure 1B:
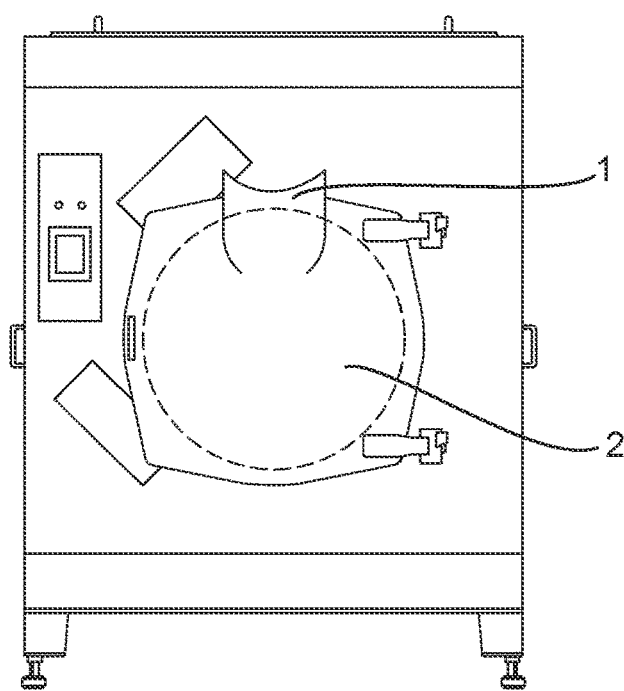
FIG. 1B shows schematically a front view of a conventional tumble chiller.

FIGS. 1A and 1B illustrate a known tumble chiller design. The known tumble chiller includes a rotatable drum which is partially immersed in a cooling liquid (not shown). Bags of food product are placed inside the drum, and are tumbled within the cooling liquid by rotation of the drum.

Bags can be loaded into the rotatable drum inside the chiller via a chute 1. Once cooled, bags may be removed from the rotatable drum by an operator opening a door 2 of the chiller, reaching inside the rotatable drum, and manually unloading each bag from the rotatable drum.

Manual removal of bags from the tumble chiller can be difficult and time consuming, especially where each bag is relatively heavy and/or where a large number of bags must be removed from the chiller, as is commonly the case in industrial food preparation.

In accordance with various embodiments, a tumble chiller is provided that comprises a belt conveyor system, i.e. instead of a conventional rotatable drum.

The belt conveyor system is configured in a first mode of operation to cause one or more articles to be moved (i.e. tumbled) within the reservoir. In this regard, the Applicant has recognised that a belt conveyor system can be configured to cause the one or more articles to be tumbled within the cooling liquid contained within the reservoir of a tumble chiller.

Furthermore, the belt conveyor system can also be configured to cause the one or more articles to be removed from the reservoir.

Thus, in accordance with various embodiments, the chiller includes a belt conveyor system that is configured to perform the dual function of both tumbling articles within the reservoir, and removing articles from the reservoir.

The tumble chiller of various embodiments accordingly allows articles to be removed from the chiller in a more straightforward manner. The tumble chiller of various embodiments also allows articles to be removed from the chiller automatically, i.e. without oversight of an operator.

Figure 2A:
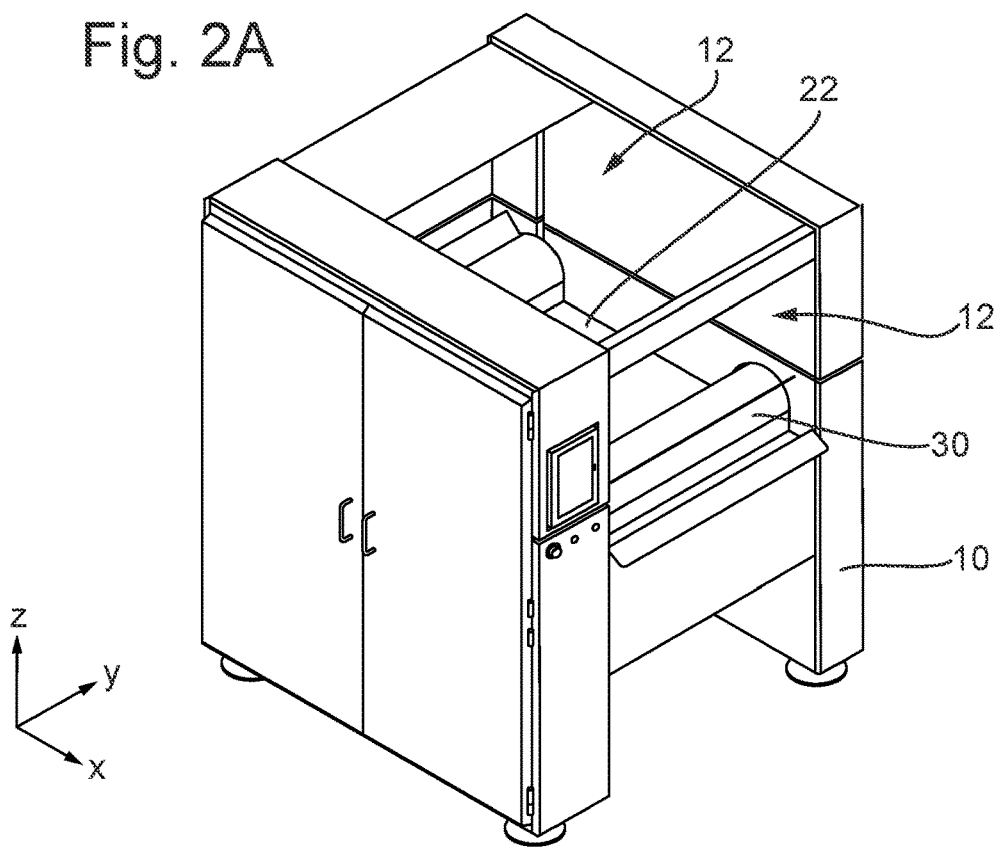
FIG. 2A shows schematically a perspective view of a tumble chiller when configured in a chilling mode of operation in accordance with various embodiments.
Figure 2B:
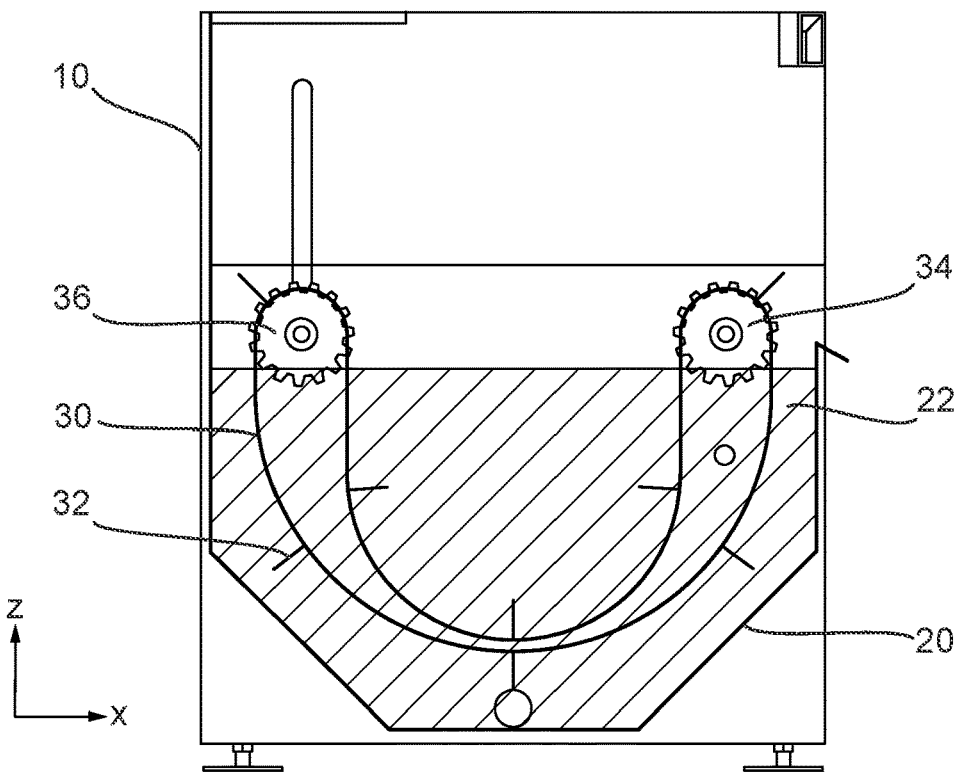
FIG. 2B shows schematically a cross-sectional view of a tumble chiller when configured in the chilling mode of operation in accordance with various embodiments.

FIGS. 2A and 2B show a tumble chiller in accordance with various embodiments.

As illustrated in FIGS. 2A and 2B, the tumble chiller may in general comprise a housing 10, and a reservoir 20 arranged within the housing.

The housing 10 may have at least one opening 12, which may be configured to allow access to and from the reservoir 20. Articles such as bagged food products may be loaded into the reservoir 20 and removed from the reservoir through the at least one opening 12 in the housing 10.

As shown in FIG. 2A, the at least one opening 12 may comprise an opening on a front surface of the housing 10 and/or an opening on a top surface of the housing 10. However, the at least one opening 12 could comprise one or more other openings, e.g. in another surface of the housing 10.

The chiller may optionally comprise one or more removable covers (not shown) such as one or more doors, etc., configured to cover one or more or each opening 12.

The reservoir 20 is configured to contain a cooling liquid 22. Thus, in embodiments, the chiller comprises a cooling liquid 22 within the reservoir 20. The reservoir 20 may have any suitable configuration. For example, as shown in FIG. 2B, the reservoir 20 may comprise a trough arranged within the housing 10.

The reservoir 20 may be a "closed" reservoir, i.e. in which a same quantity of cooling liquid 22 is retained within the reservoir 20. Alternatively, the reservoir 20 may be configured such that a flow of cooling liquid 22 may be provided to (and removed from) the reservoir 20.

The cooling liquid 22 may comprises any suitable liquid such as for example water. The cooling liquid 22 may be cooled to a relatively low temperature, such as <5° C., e.g. around 4° C. The cooling liquid 22 may be cooled in any suitable manner, e.g. using a refrigeration system.

As described above, the chiller comprises a belt conveyor system. The belt conveyor system may comprise a conveyor belt 30. Thus, in embodiments, the chiller comprises a (single) conveyor belt 30, where the (single) conveyor belt 30 is configured in the first mode of operation to cause one or more articles to be moved (tumbled) within the reservoir, and is configured in the second mode of operation to cause one or more articles to be removed from the reservoir.

As shown in FIGS. 2A and 2B, the belt conveyor system and/or the conveyor belt 30 may have a direction of travel generally in a first (x) direction. The belt conveyor system may be configured such that the width of the conveyor belt 30 extends along a second (y) direction. A third (z) direction may generally be an upward direction (when the chiller is in use). Each of the first (x), second (y) and third (z) directions may be orthogonal to one another.

The belt conveyor system may comprise any suitable conveyor belt 30 such as an endless loop conveyor belt. In various embodiments, the conveyor belt 30 comprises an open mesh belt. This allows cooling liquid 22 to pass through openings in the mesh. The conveyor belt 30 may be formed from any suitable material such as a plastic material. Plastics are generally durable even when continuously exposed to liquid.

The conveyor belt 30 may comprise one or more fins 32, such as a plurality of fins. Each fin 32 may be configured to protrude from the conveyor belt 30, for example in a direction orthogonal to a plane of the conveyor belt 30. Each fin 32 may extend across most or all of the width of the conveyor belt 30. The one or more fins 32 can assist with movement (tumbling) of the one or more articles in the first mode of operation, and with removal of the articles from the chiller in the second mode of operation.

The conveyor belt 30 may be connected to and retained by a plurality of sprockets of the belt conveyor system. The conveyor belt 30 may be arranged to run around the plurality of sprockets. Each sprocket may be configured to mesh with the conveyor belt 30. The use of sprockets to retain the conveyor belt 30 allows the conveyor belt to be accurately controlled between the first and second modes of operation (and prevents the belt 30 slipping).

In various embodiments, the conveyor belt 30 is retained by (and the plurality of sprockets comprises) a first set of one or more sprockets 34 and a second set of one or more sprockets 36. As shown in FIG. 2B, the first set of one or more sprockets 34 may be arranged at one end of the belt conveyor system and the second set of one or more sprockets 36 may be arranged at the other end of the belt conveyor system (in the first (x) direction).

At least one sprocket of the plurality of sprockets may be driven in order to drive the conveyor belt 30. In various embodiments, at least one sprocket of the first set of one or more sprockets 34 is driven and at least one sprocket of the second set of one or more sprockets 36 is also (independently) driven. This allows the conveyor belt 30 to be accurately controlled between the first and second modes of operation. Each driven sprocket may, for example, be driven by a respective motor such as an electric motor through a transmission system.

As shown in FIGS. 2A and 2B, the first set of one or more sprockets 34 may be arranged adjacent to an opening 12 in the housing 10, such as adjacent to an opening in a front surface of the housing 10. The first set of one or more sprockets 34 may comprise a single sprocket, but in embodiments comprises two sprockets arranged at either side of the chiller (in the second (y) direction).

The first set of one or more sprockets 34 may have a generally fixed position within the housing 10 (except for appropriate rotation). As shown in FIG. 2B, each sprocket of the first set of one or more sprockets 34 may be arranged adjacent to and/or partially submerged in the reservoir 20.

The second set of one or more sprockets 36 may be spaced apart from the first set of one or more sprockets 34 (in the first (x) direction). The second set of one or more sprockets 36 may be arranged generally behind the first set of one or more sprockets 34, i.e. away from an opening 12 in the housing 10, such as away from the opening in the front surface of the housing 10.

The second set of one or more sprockets 36 may comprise a single sprocket, but in embodiments comprises two sprockets arranged at either side of the chiller (in the second (y) direction).

As will be described in more detail below, in various particular embodiments, the position of the second set of one or more sprockets 36 within the housing is changeable (in the third (z) direction).

FIGS. 2A and 2B show the chiller when the second set of one or more sprockets 36 is arranged in a first, lowered, position. In this position, the second set of one or more sprockets 36 may be arranged to be level with the first set of one or more sprockets 34 (in the third (z) direction), and so adjacent to and/or partially submerged in the reservoir 20.

FIGS. 2A and 2B show the chiller when configured for operation in the first mode of operation. In this first mode of operation, the conveyor belt 30 is configured in to cause one or more articles to be moved (tumbled) within the reservoir 20, i.e. to cause one or more articles to be moved (tumbled) within the cooling liquid 22 within the reservoir 20.

In this mode of operation, the belt conveyor system may be configured such that catenary sag of (an upper part of) the conveyor belt 30 (between the first set of one or more sprockets 34 and the second set of one or more sprockets 36) causes the (upper part of the) conveyor belt 30 to adopt a form having a curved cross section, such as an approximately U-shaped cross-section.

The belt conveyor system may also be configured in this mode of operation such that catenary sag of a lower (return) part of the conveyor belt 30 (between the first set of one or more sprockets 34 and the second set of one or more sprockets 36) causes the lower (return) part of the conveyor belt 30 to adopt a form having a curved cross section, such as an approximately U-shaped cross-section, that is appropriately spaced from both the upper part the conveyor belt 30 and the walls and floor of the reservoir 20.

Articles to be chilled, such as bagged food products, can be retained (in the first (x) direction) within the curved (U-shaped) region of the (upper part of the) conveyor belt 30. The articles may be retained in the second (y) direction within the curved (U-shaped) region of the (upper part of the) conveyor belt 30 by walls of the reservoir 20.

As shown in FIG. 2B, the curved (U-shaped) region of the (upper part of the) conveyor belt 30 may extend into the reservoir 20 (and into the cooling liquid 22 contained within the reservoir 20). Thus, by depositing articles within the curved (U-shaped) region of the (upper part of the) conveyor belt 30, the articles will be submerged within the cooling liquid 22.

In the first mode of operation, the conveyor belt 30 may be driven, e.g. by driving one or both of the first set of one or more sprockets 34 and the second set of one or more sprockets 36 (e.g. at the same speed). Interaction of the conveyor belt 30 and/or the one or more fins 32 with articles contained within the curved (U-shaped) region of the (upper part of the) conveyor belt 30 will cause the one or more articles to be tumbled, i.e. in a similar manner to a conventional rotating drum. This tumbling motion of the articles in the cooling liquid 22 in turn causes rapid cooling of the articles.

In the first mode of operation, the conveyor belt 30 may be driven exclusively in one direction. However, in embodiments, the rotation direction of the conveyor belt 30 is reversible. Thus, in the first mode of operation, the conveyor belt 30 may also or instead be alternatingly driven in opposite directions, e.g. so as to rock the one or more articles within the reservoir. This may be useful, e.g. where the one or more articles are relatively fragile and/or delicate.

Figure 3A:
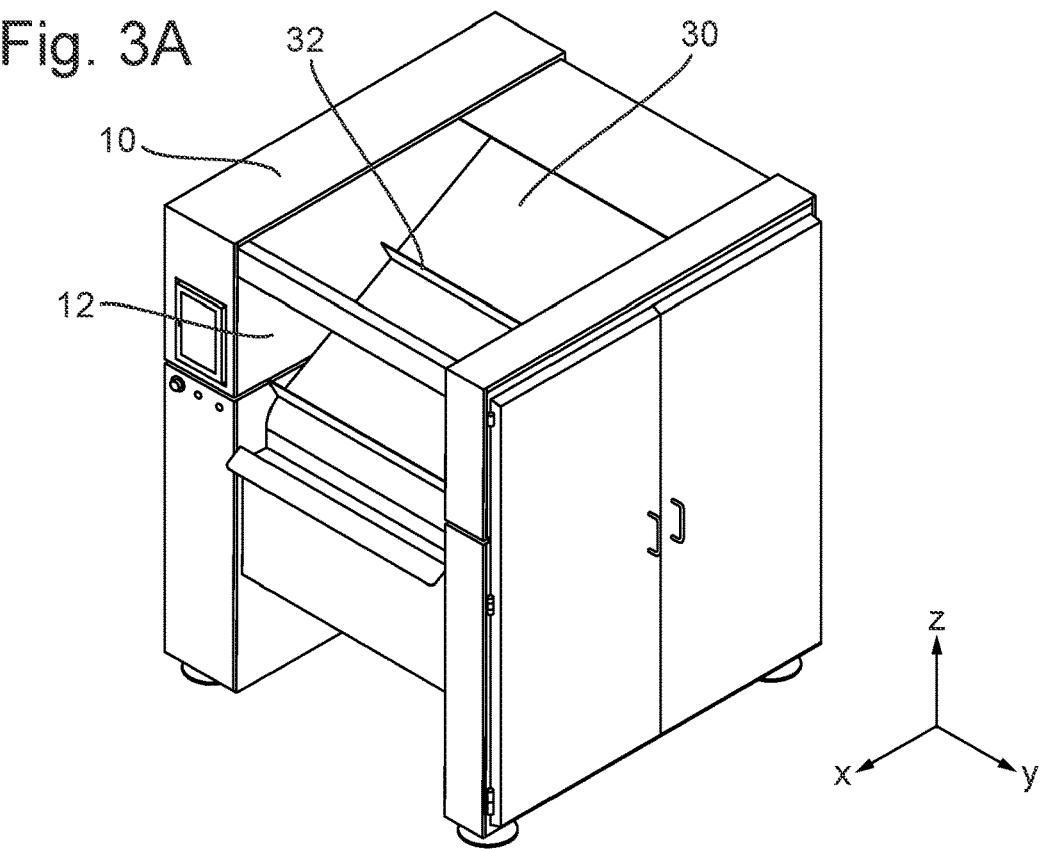
FIG. 3A shows schematically a perspective view of a tumble chiller when configured in an article removing mode of operation in accordance with various embodiments.
Figure 3B:
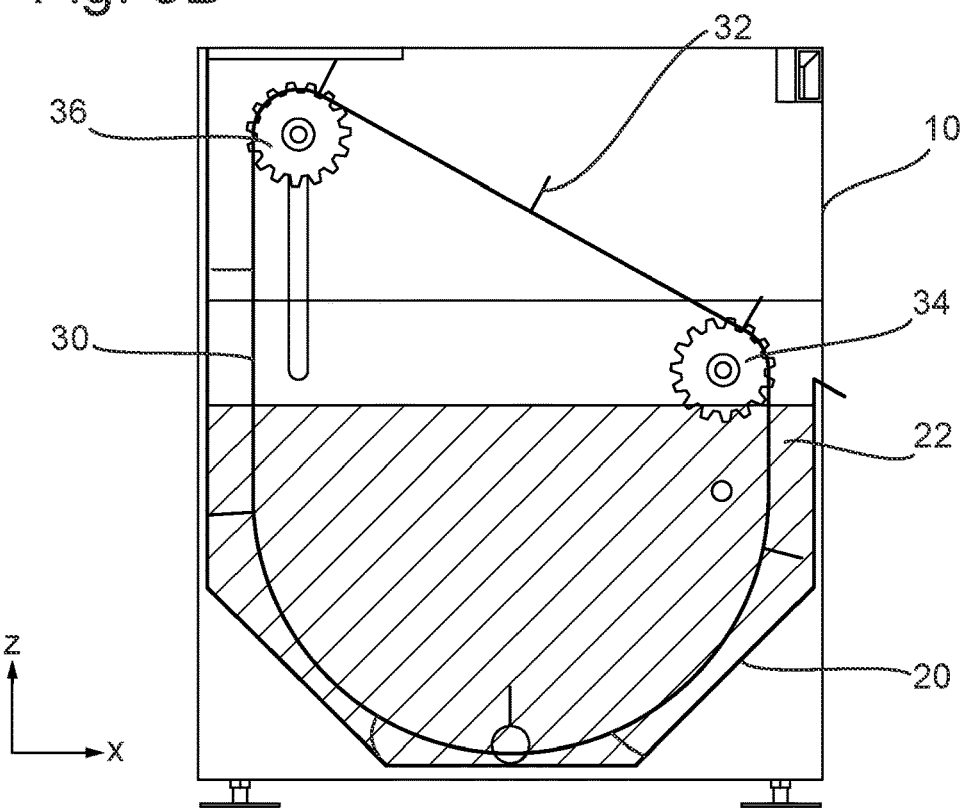
FIG. 3B shows schematically a cross-sectional view of a tumble chiller when configured in the article removing mode of operation in accordance with various embodiments.

FIGS. 3A and 3B show the chiller when configured for operation in the second mode of operation. The conveyor belt 30 is configured in the second mode of operation to cause one or more articles to be removed from the reservoir 20. The conveyor belt 30 may be further configured in the second mode of operation to cause one or more articles to be removed from the chiller.

As shown in FIG. 3B, in this mode of operation, the second set of one or more sprockets 36 may be raised to a second, raised, position. Raising the second set of one or more sprockets 36 to the raised position may cause catenary sag of (the upper part of) the conveyor belt 30 (between the first set of one or more sprockets 34 and the second set of one or more sprockets 36) to be removed, e.g. such that (the upper part of) the conveyor belt 30 becomes taut (tensioned) between the first set of one or more sprockets 34 and the second set of one or more sprockets 36. The (upper part of the) conveyor belt 30 may accordingly adopt an inclined form.

As shown in FIG. 3B, in the second mode of operation, the so-formed inclined region of the (upper part of the) conveyor belt 30 may be external to the reservoir 20 (and so external to the cooling liquid 22 contained within the reservoir 20). Thus, by raising the second set of one or more sprockets 36 to the raised position, articles contained within the curved (U-shaped) region of the conveyor belt 30 can be removed from the reservoir 20 (and from the cooling liquid 22 contained within the reservoir 20).

In other words, raising the second set of one or more sprockets 36 to the raised position causes articles within the curved (U-shaped) region of the (upper part of the) conveyor belt 30 to be lifted out of the reservoir 20 by the conveyor belt 30.

Furthermore, the conveyor belt 30 may then be driven, e.g. by driving one or both of the first set of one or more sprockets 34 and the second set of one or more sprockets 36 (e.g. at the same speed). Interaction of the conveyor belt 30 and/or the one or more fins 32 with articles on the inclined region of the conveyor belt 30 will cause the one or more articles to be removed from the chiller, i.e. via an opening 12 in the housing 10, such via the opening in the front surface of the housing 10.

Articles removed from the chiller via the opening 12 may be received, e.g. by a movable carrier such as a tote bin placed in front of the chiller (not shown).

In the second mode of operation, optionally where necessary, the first set of one or more sprockets 34 may be driven independently from the second set of one or more sprockets 36 (e.g. at a different speed and/or for different time periods) in order to ensure that the upper part of the conveyor belt 30 that extends between the first set of one or more sprockets 34 and the second set of one or more sprockets 36 becomes appropriately taut.

Once articles have been removed in the above manner, the chiller may be returned to its first mode of operation, e.g. by lowering the second set of one or more sprockets 36 to the lowered position. Again, optionally where necessary, the first set of one or more sprockets 34 may be driven independently from the second set of one or more sprockets 36 (e.g. at a different speed and/or for different time periods) in order to ensure that the upper part of the conveyor belt 30 that extends between the first set of one or more sprockets 34 and the second set of one or more sprockets 36 adopts the desired curved (U-shaped) form.

It would also be possible to use the belt conveyor system to load articles into the reservoir 20, e.g. by loading articles onto the conveyor belt 30 when the upper part of the conveyor belt 30 is removed from the reservoir 20, and then using the conveyor belt 30 to lower the articles into the reservoir 20.

Figure 4A:
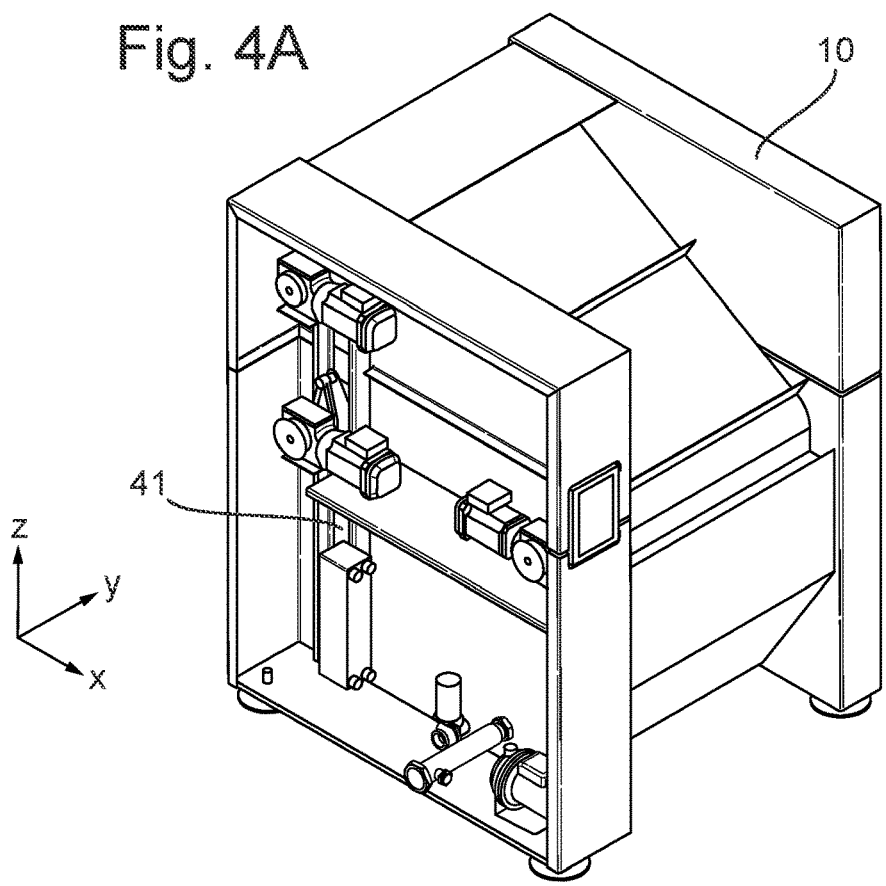
FIG. 4A shows schematically a perspective view of a tumble chiller in accordance with various embodiments.
Figure 4B:
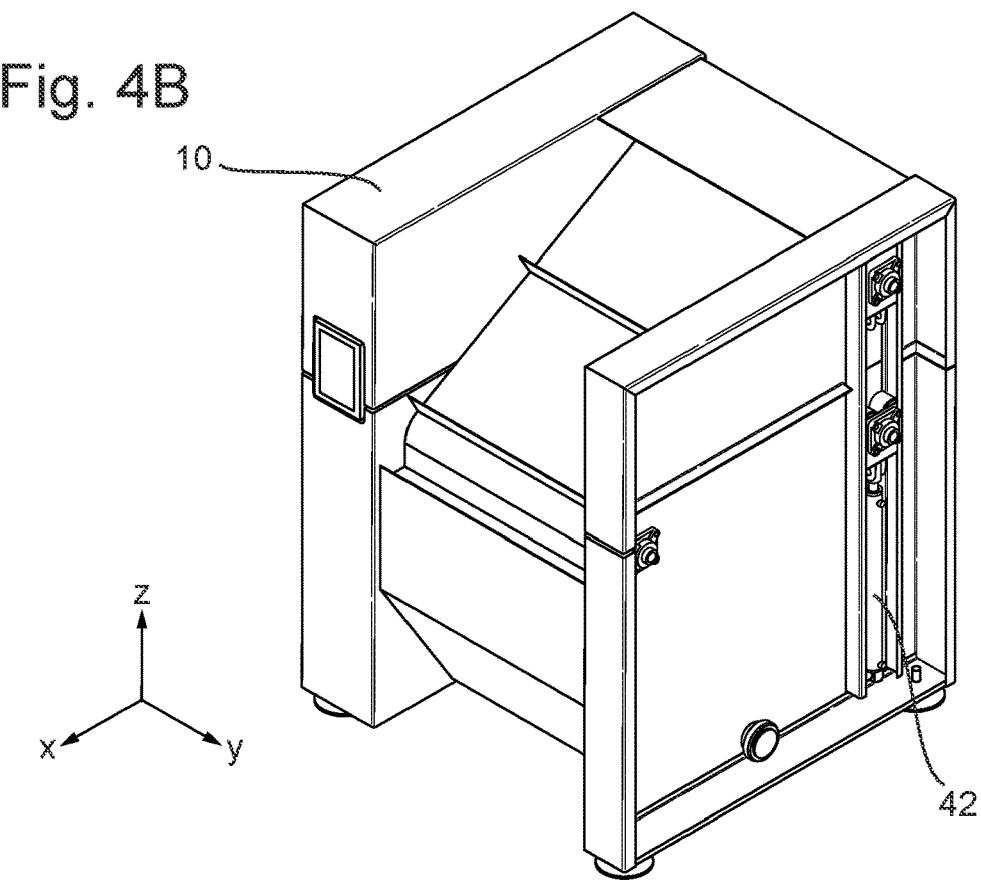
FIG. 4B shows schematically a perspective view of a tumble chiller in accordance with various embodiments.

FIGS. 4A and 4B show schematically detail of a mechanism by which the second set of one or more sprockets 34 can be moved between its first, lowered, position and its second, raised position.

As shown in FIGS. 4A and 4B, the chiller may comprise one or more cylinders 41, 42 configured to move the second set of one or more sprockets 36 between the lowered position and the raised position. The one or more cylinders 41, 42 may be coupled to the second set of one or more sprockets 36 such that extension of the one or more cylinders 41, 42 causes the second set of one or more sprockets 36 to be moved to the raised position, and such that retraction of the one or more cylinders 41, 42 causes the second set of one or more sprockets 36 to be moved to the lowered position. A first cylinder 41 may be provided on (and coupled to) one side of the second set of one or more sprockets 36, and a second cylinder 42 may be provided on (and coupled to) the other side of the second set of one or more sprockets 36 (in the second (y) direction).

In embodiments where two cylinders 41, 42 are provided and used to move the second set of one or more sprockets 36 between the lowered position and the raised position, movement of the two cylinders 41, 42 may be synchronised, e.g. so as to avoid warping and/or stretching of the belt 30, and to ensure that discharge of the articles is even.

Each cylinder 41, 42 may comprise any suitable cylinder such as a hydraulic cylinder or a pneumatic cylinder.

As can also be seen in FIG. 4A, one sprocket of the first set of one or more sprockets 34 may be driven by a motor such as an electric motor through a transmission system. As shown in FIG. 4B, the other sprocket of the first set of one or more sprockets 34 (on the other side of the chiller in the second (y) direction) may not be driven (i.e. may be an idler). Similarly, one sprocket of the second set of one or more sprockets 36 may be (independently) driven by an independent motor such as an electric motor through an independent transmission system. The other sprocket of the second set of one or more sprockets 36 (on the other side of the chiller in the second (y) direction) may not be driven (i.e. may be an idler).

Other arrangements would be possible.

It will be appreciated that the tumble chiller of various embodiments allows articles both to be tumble chilled, and to be removed from the chiller in a straightforward manner. In particular, an operator need not manually reach inside the chiller to remove the articles.

The tumble chiller of various embodiments also allows articles to be removed from the chiller automatically, i.e. without oversight of an operator. For example, the chiller may be controlled, e.g. by a computer control system, so as to tumble one or more articles for a selected time period, and to then cause the articles to be removed from the chiller at the end of the selected time period. This allows precise control over the chilling time, and means that an operator need not be physically present in order to unload the chiller.

Furthermore, the tumble chiller of various embodiments allows articles to be removed from the chiller without firstly having to remove (e.g. drain) the liquid 22 from the reservoir 20, which would conventionally be removed (e.g. drained) so as to prevent an operator coming into contact with the cooling liquid 22. The tumble chiller of various embodiments can accordingly reduce energy and water use.

Although various embodiments have been described above in terms of a tumble chiller in which one or more articles are chilled within a cooling liquid 22 retained in a reservoir 20, it would also be possible for the chiller to have a heating mode of operation, or for the system to be exclusively configured as a heater. Such a mode of operation and/or such a heater may be used, for example, to heat (e.g. reheat) one or more articles, such as one or more bagged food products, and/or to cook food contained within one or more bags (e.g. in a "sous vide" mode of operation).

Thus, further embodiments relate to a tumble chiller having a heating mode of operation and/or to a heater such as a tumble heater, that may be configured to heat one or more articles, such as one or more bagged food products. These embodiments may be substantially similar to the chiller embodiments described above, and may include any one or more or each of the features as described above, e.g. modified as appropriate so that the cooling liquid 22 is replaced with a heating liquid. Thus, for example, in these embodiments, the system may be configured to heat each bag to any suitable temperature, the heating liquid may be heated to any suitable temperature (e.g. <100° C.), and the heating liquid may be heated in any suitable manner e.g. using a heating system.

Although the present invention has been described with reference to preferred embodiments, it will be understood by those skilled in the art that various changes in form and detail may be made without departing from the scope of the invention as set forth in the accompanying claims.

The invention claimed is:

1. A system for cooling or heating one or more articles, the system comprising:
a reservoir configured to contain a liquid; and
a belt conveyor system comprising a conveyor belt driven by sprockets, the sprockets comprising a first set of one or more sprockets at a top of the reservoir and a second set of one or more sprockets at the top of the reservoir;
wherein the belt conveyor system is configured in a first mode of operation such that an upper part of the conveyor belt between the first set of one or more sprockets and the second set of one or more sprockets has a curved form to cause one or more articles to be tumbled or rocked within the reservoir; and
wherein the belt conveyor system is configured in a second mode of operation such that the upper part of the conveyor belt between the first set of one or more sprockets and the second set of one or more sprockets becomes taut and inclined to cause one or more articles to be removed from the reservoir,
the belt conveyor system being configured such that the second set of one or more sprockets is in a raised position in the second mode of operation that is vertically higher than the first set of one or more sprockets.

2. The system of claim 1, wherein the belt conveyor system is configured in the second mode of operation to cause one or more articles to be removed from the cooling or heating system.

3. The system of claim 1, wherein:
the belt conveyor system is configured such that the second set of one or more sprockets is arranged in a lowered position in the first mode of operation; and
the belt conveyor system is configured to move the second set of one or more sprockets to the raised position in the second mode of operation.

4. The system of claim 1, further comprising one or more cylinders configured to move the second set of one or more sprockets between the lowered position and the raised position.

5. The system of claim 1, wherein the conveyor belt comprises one or more fins.

6. The system of claim 1, wherein the conveyor belt comprises a mesh conveyor belt.

7. A method of cooling or heating one or more articles, the method comprising:
driving a conveyor belt using sprockets, wherein the sprockets comprise a first set of one or more sprockets at a top of a reservoir and a second set of one or more sprockets at a top of the reservoir;
using the conveyor belt to tumble or rock one or more articles within the reservoir containing a cooling or heating liquid, an upper part of the conveyor belt between the first set of one or more sprockets and the second set of one or more sprockets having a curved form; and then
using the conveyor belt to remove the one or more articles from the reservoir by causing the upper part of the conveyor belt between the first set of one or more sprockets and the second set of one or more sprockets to become taut and inclined, the second set of one or more sprockets being vertically higher than the first set of one or more sprockets.

8. The method of claim 7, wherein the conveyor belt forms part of a cooling or heating system, and wherein the method further comprises using the conveyor belt to remove the one or more articles from the cooling or heating system.

9. The method of claim 7, comprising:
operating the second set of one or more sprockets in a lowered position when using the conveyor belt to tumble or rock one or more articles within the reservoir; and
using the conveyor belt to remove the one or more articles from the reservoir by moving the second set of one or more sprockets to a raised position, the raised position being vertically higher than the lowered position.

* * * * *